(12) United States Patent
Logan et al.

(10) Patent No.: US 10,506,616 B2
(45) Date of Patent: Dec. 10, 2019

(54) PRIORITIZING PREFERRED NETWORKS

(71) Applicant: Charter Communications Operating, LLC, St. Louis, MO (US)

(72) Inventors: William Kenneth Logan, Overland Park, KS (US); Oliver James Jauncey, Bromley (GB)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 77 days.

(21) Appl. No.: 15/669,167

(22) Filed: Aug. 4, 2017

(65) Prior Publication Data

US 2019/0045517 A1   Feb. 7, 2019

(51) Int. Cl.
| | | |
|---|---|---|
| *H04W 72/10* | (2009.01) | |
| *H04W 8/02* | (2009.01) | |
| *H04W 48/18* | (2009.01) | |
| *H04W 72/04* | (2009.01) | |
| *H04W 76/10* | (2018.01) | |
| H04W 88/08 | (2009.01) | |
| H04W 84/12 | (2009.01) | |

(52) U.S. Cl.
CPC .............. *H04W 72/10* (2013.01); *H04W 8/02* (2013.01); *H04W 48/18* (2013.01); *H04W 72/0446* (2013.01); *H04W 76/10* (2018.02); H04W 72/048 (2013.01); H04W 84/12 (2013.01); H04W 88/08 (2013.01)

(58) Field of Classification Search
CPC .......... G01W 1/10; H04L 67/18; H04L 67/22; H04L 67/306; H04L 12/2856; H04W 72/10; H04W 72/0446; H04W 72/048; H04W 76/10; H04W 8/02; H04W 48/18; H04W 88/08
See application file for complete search history.

(56) References Cited

U.S. PATENT DOCUMENTS

| | | | |
|---|---|---|---|
| 6,636,746 B1 | 10/2003 | Hashem et al. | |
| 8,073,441 B1 * | 12/2011 | Unger | H04W 48/18 455/404.2 |
| 9,510,258 B1 | 11/2016 | Chaudhuri et al. | |

(Continued)

FOREIGN PATENT DOCUMENTS

WO   WO-2016095974 A1   6/2016

OTHER PUBLICATIONS

File History of U.S. Appl. No. 15/669,151, 54 pages, filed Aug. 4, 2017.

(Continued)

*Primary Examiner* — Dung B Huynh
(74) *Attorney, Agent, or Firm* — Gazdzinski & Associates, PC

(57) ABSTRACT

An example technique performed by a client on a device includes: detecting a mobility state of the device in a presence of a wireless network; determining, based at least in part on the mobility state, that the wireless network is a preferred wireless network for the device; in response to determining that the wireless network is a preferred wireless network, elevating a priority of the wireless network in a set of wireless networks to which the device is connectable; and connecting the device to the wireless network based, at least in part, on the priority of the wireless network.

29 Claims, 3 Drawing Sheets

(56) References Cited

U.S. PATENT DOCUMENTS

| | | | |
|---|---|---|---|
| 2006/0166677 A1 | 7/2006 | Derakshan et al. | |
| 2006/0193287 A1 | 8/2006 | Ooshima et al. | |
| 2007/0275717 A1 | 11/2007 | Edge et al. | |
| 2008/0287125 A1 | 11/2008 | Hind et al. | |
| 2009/0291686 A1 | 11/2009 | Alpert et al. | |
| 2010/0046466 A1 | 2/2010 | Morimoto et al. | |
| 2010/0149970 A1* | 6/2010 | Miranda | H04W 28/02 370/229 |
| 2010/0159948 A1* | 6/2010 | Spivey | H04L 12/10 455/456.1 |
| 2011/0029236 A1* | 2/2011 | Zhou | G01C 21/20 701/532 |
| 2011/0165896 A1 | 7/2011 | Stromberg et al. | |
| 2011/0319084 A1 | 12/2011 | Meshkati et al. | |
| 2012/0238287 A1* | 9/2012 | Scherzer | H04W 48/16 455/456.1 |
| 2013/0044614 A1 | 2/2013 | Aguirre et al. | |
| 2013/0067535 A1* | 3/2013 | Kang | H04W 48/18 726/3 |
| 2013/0331098 A1* | 12/2013 | Balasubramaniyan | H04W 48/16 455/434 |
| 2013/0344857 A1 | 12/2013 | Berionne et al. | |
| 2013/0347073 A1 | 12/2013 | Bryksa et al. | |
| 2014/0071895 A1 | 3/2014 | Bane et al. | |
| 2014/0092731 A1* | 4/2014 | Gupta | H04W 4/70 370/229 |
| 2014/0274044 A1 | 9/2014 | Lee et al. | |
| 2014/0315536 A1* | 10/2014 | Chow | H04W 8/18 455/419 |
| 2015/0003417 A1* | 1/2015 | Akiyoshi | H04W 48/18 370/331 |
| 2015/0181405 A1* | 6/2015 | Dua | H04W 4/02 455/456.3 |
| 2015/0245280 A1* | 8/2015 | Zhou | H04W 36/32 455/434 |
| 2015/0312833 A1 | 10/2015 | Gresset et al. | |
| 2015/0373633 A1* | 12/2015 | Chhabra | H04W 48/18 455/435.2 |
| 2016/0227544 A1 | 8/2016 | Katar et al. | |
| 2016/0234674 A1* | 8/2016 | Maguire | H04W 48/16 |
| 2016/0316410 A1* | 10/2016 | Tan | H04W 36/30 |
| 2016/0323900 A1 | 11/2016 | De et al. | |
| 2016/0345228 A1 | 11/2016 | Liu et al. | |
| 2016/0381606 A1* | 12/2016 | Lou | H04W 36/0066 370/331 |
| 2017/0105216 A1 | 4/2017 | Jung et al. | |
| 2018/0061373 A1* | 3/2018 | Sato | G06Q 30/0267 |
| 2018/0184330 A1 | 6/2018 | Egner et al. | |

OTHER PUBLICATIONS

File History of U.S. Appl. No. 15/669,182, 52 pages, filed Aug. 4, 2017.

File History of U.S. Appl. No. 15/669,192, 48 pages, filed Aug. 4, 2017.

* cited by examiner

PRIORITIZING PREFERRED NETWORKS

TECHNICAL FIELD

This specification relates generally processes for prioritizing preferred networks when connecting to a wireless network.

BACKGROUND

A mobile device, such as a smartphone, may connect to a wireless network, such as a WiFi network. Wireless networks can be maintained at various locations. For example, a user of the mobile device can maintain a wireless network in the user's home. In another example, the user can maintain a wireless network in the user's place of business.

SUMMARY

An example method performed by a client on a device includes: detecting a mobility state of the device in a presence of a wireless network; determining, based at least in part on the mobility state, that the wireless network is a preferred wireless network for the device; in response to determining that the wireless network is a preferred wireless network, elevating a priority of the wireless network in a set of wireless networks to which the device is connectable; and connecting the device to the wireless network based, at least in part, on the priority of the wireless network. The example method may include one or more of the following features, either alone or in combination.

The example method may comprise determining a duration that the device is in the mobility state in the presence of the wireless network. Determining that the wireless network is a preferred wireless network may be based, at least in part, on the duration. The example method may comprise obtaining usage information about usage of the device on the wireless network. Determining that the wireless network is a preferred wireless network may be based, at least in part, on the usage information. The usage information may be based on data exchanged with the wireless network over at least a period of time. The example method may comprise obtaining time information based on when the device is in the mobility state. Determining that the wireless network is a preferred wireless network may be based, at least in part, on the time information. The time information may be based on a time of day that the user is in the presence of the wireless network. The example method may comprise obtaining time information based on when the device is in the presence of the wireless network. Determining that the wireless network is a preferred wireless may be based, at least in part, on the time information.

The mobility state may be a first mobility state. The mobility state may be detected multiple times over the course of a time period resulting in multiple occurrences of the mobility state. The multiple occurrences of the mobility state may include the first mobility state. Determining that the wireless network is a preferred wireless network may be based, at least in part, on the multiple occurrences of the mobility state.

The example method may comprise all of determining a duration that the device is in the mobility state in the presence of the wireless network; obtaining usage information about usage of the device on the wireless network; and obtaining time information based on when the device is in the mobility state or based on when the device is in the presence of the wireless network. Determining that the wireless network is a preferred wireless network may be based, at least in part, on the duration, the usage information, and the time information.

Elevating the priority of the wireless network may comprise applying one or more weights to one or more voting modules of the client to generate votes. Each voting module may evaluate one or more of the attributes and generate a vote. The one or more attributes may relate to the device, to one or more wireless networks, or to both the device and the one or more wireless networks. Connecting the device to the wireless network based, at least in part, on the priority of the wireless network may comprise: making a determination, based on the votes, to connect the device to the wireless network; and controlling the device to connect to the wireless network based on the determination.

The preferred network may be a home network of a user of the device. The preferred network may be a work network of the user of the wireless device. The example method may comprise receiving a policy from a server. The policy may identify one or more preferred networks and include instructions to the client to elevate a priority of the one or more preferred networks in a set of wireless networks.

The example method may comprise detecting that a user has one or more times manually switched from, or disconnected from, the wireless network to which the client connected; based on the detecting, determining that the network is not a preferred network; and reducing a priority of the network in a set of wireless networks to which the device is connectable.

Any two or more of the features described in this specification, including in this summary section, may be combined to form implementations not specifically described in this specification.

All or part of the processes, methods, systems, and techniques described herein may be implemented as a computer program product that includes instructions that are stored on one or more non-transitory machine-readable storage media, and that are executable on one or more processing devices. Examples of non-transitory machine-readable storage media include, e.g., read-only memory, an optical disk drive, memory disk drive, random access memory, and the like. All or part of the processes, methods, systems, and techniques described herein may be implemented as an apparatus, method, or system that includes one or more processing devices and memory storing instructions that are executable by the one or more processing devices to perform the stated operations.

The details of one or more implementations are set forth in the accompanying drawings and the description below. Other features and advantages will be apparent from the description and drawings, and from the claims.

DESCRIPTION OF THE DRAWINGS

Like reference numerals in different figures indicate like elements.

DETAILED DESCRIPTION

Figure 1:
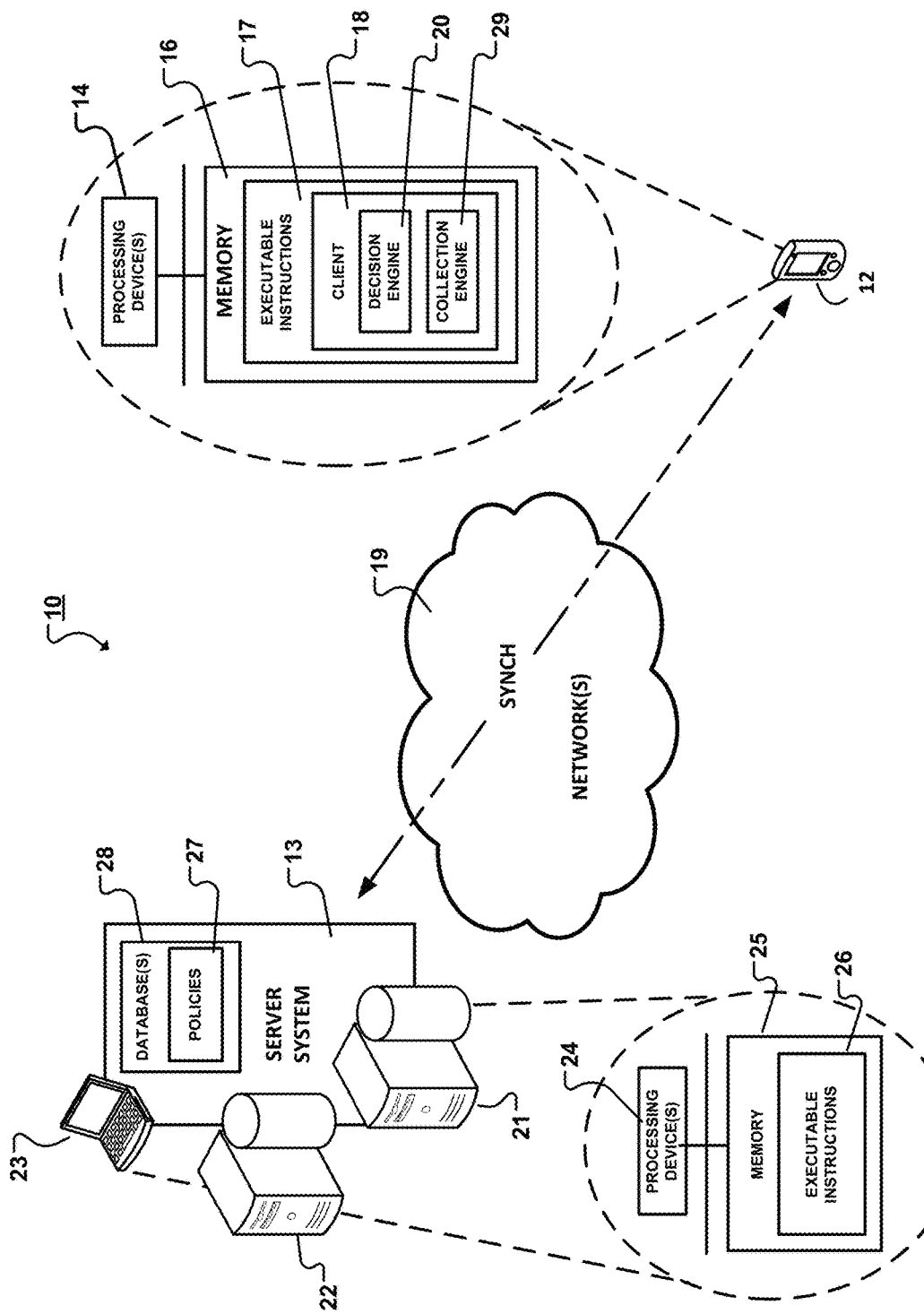
FIG. 1 is a block diagram of an example computer/network architecture on which the example processes described herein may be implemented.

Described herein are example processes, which may be performed by a client on a mobile device ("device"), that identifies preferred wireless networks, such as home or work networks, and prioritizes connection to those networks over other networks. For example, the processes may identify a user's home network and prioritize connection of the device to the user's home network. The example processes are rooted in computer technology in order to overcome a problem specifically arising in the realm of computer networks. In this regard, different wireless networks have different performance profiles. For example, some wireless networks may provide poor performance for a device. For security reasons, some wireless networks may not allow a device to access particular content, such as documents maintained on a local server. By contrast, a preferred wireless network, such as a work or home network, may provide better performance than other non-preferred wireless networks. Similarly, a preferred network may allow the user to access content, such as files, resident on that network. Other advantages not specifically listed may also result from connection to a preferred network.

Accordingly, the example processes described herein identify a user's preferred network or networks, and prioritize connection to those networks, where appropriate. In some implementations, the processes identify the user's preferred networks based on usage of the device over a period of time. For example, the processes may monitor the device for a period of time, such as seven (7) days, and identify one or more networks to which the device connected during that time as being preferred networks. Any appropriate period of time may be used, and the processes are not limited to a seven-day period. Monitoring may include, but is not limited to, identifying networks that the device connected to during that period of time, identifying the duration for which the connection occurred, identifying the time of the connection, identifying the regularity of the connection, and identifying the mobility state of the device during the connection. When one or more of these attributes reaches some baseline, a network may be identified as a preferred network for the device. In some implementations, additional information may be used to characterize an identified network, e.g., as a home or work network. An example of a baseline is a threshold, a combination of thresholds, a range, or any other appropriate information against which to evaluate (e.g., to compare) attributes, such as usage information, mobility state, and so forth.

In this regard, the mobility state corresponds to an amount of motion experienced by the mobile device. For example, the mobility state may be characterized by a speed or velocity of the device. Velocity may be detected, at least in part, using an accelerometer on the device. In some implementations, velocity may be detected based, in part, on a duration of time that the device has been in the presence of a wireless network or networks. In this regard, velocity may be detected based on a combination of appropriate factors including, but not limited to, accelerometer readings, the duration of time that the device is in the presence of a wireless network, global positioning system (GPS) readings, and so forth. In some implementations, the mobility state may be characterized by movements in addition to, or instead of, the velocity of the device. For example, in some cases, rotational movements, pivoting movements, acceleration, deceleration, or other types of movement may affect, or may factor into, the characterization of a mobility state.

The processes may be implemented using one or more policies received form a server system, which may include one or more servers. The policies may specify the attributes to use to identify the preferred networks, the values of those attributes, and the operations for prioritizing preferred networks over other networks when making a wireless network connection. By way of example, a policy may specify that a wireless network is a preferred wireless network if: a device does not move at a relatively high velocity for a period of time in the presence of the wireless network, the device's connection to the wireless network is regular, and/or the connection typically occurs at a certain time of day. The policies may include information about the device, such as an Internet service provider (ISP) for the device and, where appropriate, information about the device's user, such as their city of residence, their work location, and so forth. Information obtained during monitoring that is indicative of a preferred network and that matches the residence or work location may be used to characterize a network. For example, if a subnet address indicates a location that is coincident with the user's home address, and a network at that location is identified as preferred, the processes may characterize the network as the device's home network. In some implementations, the characterization may be automatic—e.g., absent user input. In some implementations, the characterization may require user confirmation. For example, a user may be prompted by a notification on the mobile device to confirm that a network is their home network.

In some implementations, the processes prioritize one or more preferred networks over non-preferred networks. In some implementations, prioritization includes always connecting to a preferred network over a non-preferred network regardless of performance of the preferred network and the non-preferred network. In some implementations, prioritization includes increasing the likelihood that a device will connect to a preferred network over a non-preferred network. For example, if two networks—including a preferred and a non-preferred network—are substantially equal in terms of one or more attributes, such as throughput or available bandwidth, the processes may configured the device so that it is more likely that the device will connect to the preferred network rather than the non-preferred network. In some implementations, the device may be controlled to connect to a preferred network even if the non-preferred network provides better performance than the preferred network. For example, if the non-preferred network results in less than a threshold amount of performance improvement relative to the preferred network, the device may connect to the preferred network. In this example, however, if the non-preferred network provides more than the threshold amount of performance improvement, then the device may connect to the non-preferred network. Considerations other than performance may affect the device's network connection preference. Information for specifying how, when, and under what circumstances to connect to a preferred network over a non-preferred network, and vice versa, may be specified in one or more policies uploaded to the device.

In some implementations, prioritizing connection to a wireless network may include ranking wireless networks, and controlling connection to the wireless networks based, at least in part, on the rankings. For example, the processes may identify, during device operation, preferred wireless networks for a device, and prioritize connection over those wireless networks by moving the preferred wireless networks up in the rankings. When controlling the device to connect to a wireless network, the device may start with the highest-ranked wireless network on a list and move down the list until a wireless network in-range of the device is encountered, and attempt connection to the wireless network. If a connection cannot be made for any reason, the client may move to the next, lower-ranked wireless network on the list to attempt connection. This process may continue until a connection is made or until there are no wireless networks to consider. In examples where there is only one wireless network, the mobile device may connect to that wireless network, and reevaluate the list upon encountering additional wireless networks. In some implementations, network ranking may be a single factor among multiple factors that determines whether a device connects to a preferred network.

In this regard, in some implementations, attributes in addition to network preference may be used in determining which network to connect to among multiple networks. For example, as explained above, performance of the device over a wireless network—whether preferred or non-preferred—may impact the device's decision to connect to a wireless network, in some cases. Accordingly, in some implementations, the processes employ voting modules to evaluate a network that is a candidate for connection ("candidate network") based on various attributes, including based on whether a wireless network is preferred. In some implementations, different voting modules may evaluate different attributes. For example, one voting module may evaluate whether a network is a preferred network, another voting module may evaluate throughput for the candidate network, another module may evaluate latency for the candidate network, and so forth.

In some implementations, each voting module casts a vote indicating whether or not to connect to the candidate network. The votes may be used to determine whether to connect to the candidate network. For example, in some implementations, unanimous "yes" votes are required to connect to the candidate network. In some implementations, to prioritize preferred networks, votes cast by the voting module or the voting modules that evaluate preferred networks may be weighted more heavily than those cast by other voting modules. In some implementations, votes may be cast in order of network rankings, and the first network that meets some baseline—e.g., is a preferred network and/or has a predefined level of performance—may be selected for connection. By employing voting modules in this manner, in some cases it is possible to connect the mobile device to a preferred network and also, in some implementations, to take into account other factors, such as performance.

In some examples, the wireless networks include WiFi networks; however, the processes described herein ("the processes") for prioritizing preferred networks for connection may be used with any appropriate type of wireless network, examples of which are provided below. In some implementations, the example processes are performed, at least in part, on a client on a mobile device. Operations performed by the processes may include detecting a mobility state of the device in a presence of a wireless network, determining (e.g., inferring), based at least in part on the mobility state, that the wireless network is a preferred wireless network for the device, and ranking the preferred network among a set of networks. The operations may also include obtaining attributes relating to a mobile device, to one or more wireless networks, or to both the mobile device and the one or more wireless networks, and evaluating those attributes and the priority of the preferred network in voting modules on the client to generate votes. In some implementations, a vote indicates whether a voting module approves connection to a candidate network, denies connection to the candidate network, or abstains, in which case the voting module's vote does not factor into the connection decision.

In some implementations, each voting module evaluates one attribute and casts a single vote; however, in some implementations, a single voting module may evaluate one or more attributes and cast one or more votes. The client makes a determination, based on the votes cast, whether to connect the device to a candidate wireless network, or to maintain an existing connection between the device and a wireless network. The client then controls the device based on this determination. In some implementations, the client may control the device either to maintain an existing connection, or to sever the existing connection and to make a new connection to the candidate network. In some implementations, the client may control the device to make a new connection without severing an existing connection. For example, there may be no existing connection to sever, or the device may support connection to multiple wireless networks concurrently. In this regard, following a decision to connect to a wireless network, the client may attempt to make the connection. However, not all attempts will be successful for a variety of reasons. So, even where it is voted to connect to a wireless network, in the end a connection may not be established.

The voting modules may evaluate one or more network attributes and/or device attributes in determining whether to connect to a wireless network. For example, the voting modules may evaluate whether a candidate network is a preferred wireless network. Examples of other attributes that may be evaluated by the voting modules include, but are not limited to, network or device attributes such as throughput, quality-of-service (QoS), available bandwidth, network security, network signal strength, network signal-to-noise (SNR) ratio, network signal band, device Internet service provider (ISP), number of users on the network, or some combination of these or other attributes may be taken into account. This list is not exhaustive, and any appropriate attributes may be taken into account in determining whether to connect to a wireless network. Device processing capabilities (e.g., how many clock cycles a CPU can perform per second), device internal memory, remaining device battery life, device battery capacity, and so forth may also be taken into account by the voting modules, e.g., to evaluate device performance on a network. In some implementations, one or more attributes may be weighted, depending upon their importance to the device's user or to a third party associated with the device (e.g., an ISP). For example, if connection to a preferred network is designated by a policy as a priority, a vote that is based on network preference may be weighted greater than votes based on other attributes in determining whether connect to a wireless network.

The example processes may be performed, in whole or in part, by the client, which may be stored in memory on the mobile device. The client may include one or more software modules comprised of executable instructions to implement the processes described herein, including those for detecting and prioritizing preferred networks when connecting to a wireless network. In some implementations, the client runs continuously in the background during device operation. The example processes may be implemented, at least in part, also using one or more servers. The servers may include one or more software modules comprised of executable instructions to configure the mobile device to implement the processes. For example, in some implementations, the servers may store policies that impact which voting modules are used by the client, how the voting modules evaluate network and/or device attributes, weights, if any, to apply to various votes, voting results that enable or prevent a network connection, and so forth. In some implementations, the policies include data for influencing connection between a mobile device and one or more wireless networks. The data may represent, e.g., the voting modules, baseline values for the voting modules, and other components described herein for influencing a connection between the device and a wireless network.

The policies may be loaded onto the servers by an owner of the mobile device or by any other appropriate party having an interest in the operation of the mobile device. For example, an ISP, a mobile network provider, or other party may load the policies on the servers. A Web interface, application programming interface (API), or other appropriate interface may be used to load the policies onto the server. The mobile device may synchronize ("synch") with the server intermittently, periodically, or at any appropriate time to receive, from the server, an operational policy ("policy") that is designated for the mobile device. Synching may be user-initiated or it may be performed automatically based on time or some operational trigger. Either the mobile device or the server may initiate communication. The mobile device and the server may communicate with each other over the Internet or over any other appropriate network or networks. In some implementations, the server may push a policy to the mobile device, or the mobile device may pull a policy from the server. In some examples, the policies on the server may be indexed by telephone number, user name, address, device identifier, or other appropriate indicia. The server may recognize the mobile device based on information such as this, and access appropriate policies for the mobile device.

An example policy for a mobile device may specify, among other things, that the client is to give connection preference to preferred wireless networks. The example policy for a mobile device may specify, among other things, that each voting module is to evaluate an attribute relative to a predefined baseline. An example of a baseline is a threshold, a combination of thresholds, a range, or any other appropriate information against which to evaluate (e.g., to compare) one or more values, such as attribute values. The policy may provide at least some of the predefined baselines against which each attribute is evaluated. The example policy may also require that each voting module output a single vote based on its evaluation, and that the decision to connect, or not to connect, to a candidate wireless network be based, at least in part, on the votes. In some implementations, the decision to connect, or not to connect, to a candidate wireless network may be based solely on the votes including the vote resulting from evaluation of whether a network is a preferred network. In some implementations, the decision to connect, or not to connect, to a candidate wireless network may be based on the votes in combination with one or more other factors. An example of these other factors includes, but is not limited to, a mobility state of the device.

In some implementations, each vote has one of the following values: approve, deny, or abstain; however, a policy may define votes in any appropriate manner. In this example, a vote to approve indicates to approve connection to the candidate wireless network; a vote to deny indicates to deny connection to the candidate wireless network; and a vote to abstain indicates that that voting module that cast the vote intends to have no effect on connection to the candidate wireless network. The result of the voting is interpreted, and connection is, or is not, attempted and implemented based on the result. In some implementations, to approve a connection to a wireless network, the vote must be unanimous. In some implementations, there must be at least one vote to approve the connection, and no votes to deny the connection. There may, however, be votes to abstain. In some implementations, to deny a connection to a wireless network, only a single deny vote is required. For example, all other votes may be to approve or to abstain; however, if a single deny vote is cast, the connection may be denied. In some implementations, a majority of votes to approve may be required to approve the connection, without regard to the number of deny or abstain votes. In general a policy may set any appropriate criteria for approving or denying a connection.

FIG. 1 shows an example computer/network architecture 10 on which the example processes may be implemented, including the processes for prioritizing preferred networks when connecting to a wireless network. The processes, however, are not limited to use with the FIG. 1 architecture, and may be implemented on any appropriate computer architecture and/or network architecture.

In FIG. 1, example computer/network architecture 10 includes a mobile device 12 and a server system 13. The mobile device may be, or include, any appropriate device capable of communicating over a computer network including, but not limited to, a smartphone, a cellular telephone, a digital camera, a tablet computing device, a laptop computer, and so forth. Mobile device 12 may include one or more processing devices 14 (e.g., microprocessors) and memory 16 storing computer/machine-executable instructions 17 that are executable by the one or more processing devices. The instructions may be part of one or more computer programs that implement a client 18 that controls all or part of the functionality described herein, including operations for identifying preferred networks, for determining whether to connect to the preferred networks, and for attempting and making the connection. In some implementations, the client may include a decision engine 20 that implements the processes and system described herein. In some implementations, the client may include a collection engine 29, which obtains network attributes, device attributes, or both network and device attributes, and provides those attributes to the decision engine. In some implementations, the collection engine performs the monitoring described herein to obtain information relating to the preferred network or networks, and the decision engine uses the information to identify the preferred network or networks. In some implementations, the decision engine and the collection engine include functionality other than that described herein. In some implementations, mobile device 12 may be connected to, and accessible over, any appropriate network 19, such as a WiFi network, an LTE (long-term evolution) network, and so forth.

Server system 13 may include one or more computing devices 21, 22, 23 examples of which may include one or more servers, desktop computers, mobile devices, and so forth. An example server system may include one or more processing devices 24 (e.g., microprocessors) and memory 25 storing instructions 26 that are executable by the one or more processing devices. The instructions are part of one or more computer programs that may be used to implement at least part of the processes described herein. For example, the instructions may enable communication between the mobile device and the server system in order to provide the client on the mobile device with policies 27 that control the device's operation, including to prioritize connection to preferred wireless networks as described herein. These policies may be stored in a database 28 on the server system or at any other appropriate location that is accessible to the server system. Server system 12 may also be connected to, and accessible over, a wired or wireless network 19. In some implementations, the processes may not use the server system, but rather may be implemented solely on the mobile device. For example, policies may be pre-installed on the mobile device, or a user of the mobile device may program the mobile device with one or more appropriate policies.

In some implementations, as described herein, the policies used by the client may be learned policies. More specifically, the server system may provide a policy or policies containing provisions that are generic and applicable to a class or classes of device, such as a particular type of smartphone. However, in some implementations, learned policies include provisions that are device-specific, e.g., they are unique to the mobile device instance, and are determined based on operation of the mobile device over time. Computer-executable code to implement learning processes on the mobile device may be pre-stored in the mobile device or obtained from the server system. In an example, based on connection history and other information available on the mobile device, the client may learn the identity of the mobile device's preferred networks, such as a home network or a work network. This information may be ranked and incorporated into a voting module, which may evaluate whether a candidate network is a preferred network for the device. If the candidate network is a preferred network, the voting module may vote to approve connection, for example. If the candidate network is not a preferred network, the voting module may vote to deny connection or to abstain. In some implementations, the voting module evaluating whether a network is a preferred network may override other voting modules. For example, if a preferred network is identified, the client may control the device to connect to a preferred network. If more than one preferred network are in-range, the client may evaluate the preferred networks for which one has the best performance or some other criteria, and then connect to that network. In some implementations, a vote indicating a preferred network may be weighted more than other votes. In some implementations, a policy provided by the server for a class of devices may be customized for a particular device based on information learned by that device during its operation.

In some implementations, a policy received from the sever system may specifically override a determination made by a device that a network is a preferred network. For example, the client may learn one or more preferred networks based on device behavior over time and, under an existing policy, prefer connection to those networks over other non-preferred networks. However, a subsequent or other policy may instruct the client to override what it has learned, and to use only networks identified as preferred in the subsequent or other policy. In some implementations, this may involve elevating the preferred networks from the policy in a ranking of networks to which the device may connect, as described herein.

Mobile device 12 and server system 13 may communicate with each other, and with other systems, such as those described herein, over one or more computer networks 19, which may include wireless and/or wired networks.

Figure 2:
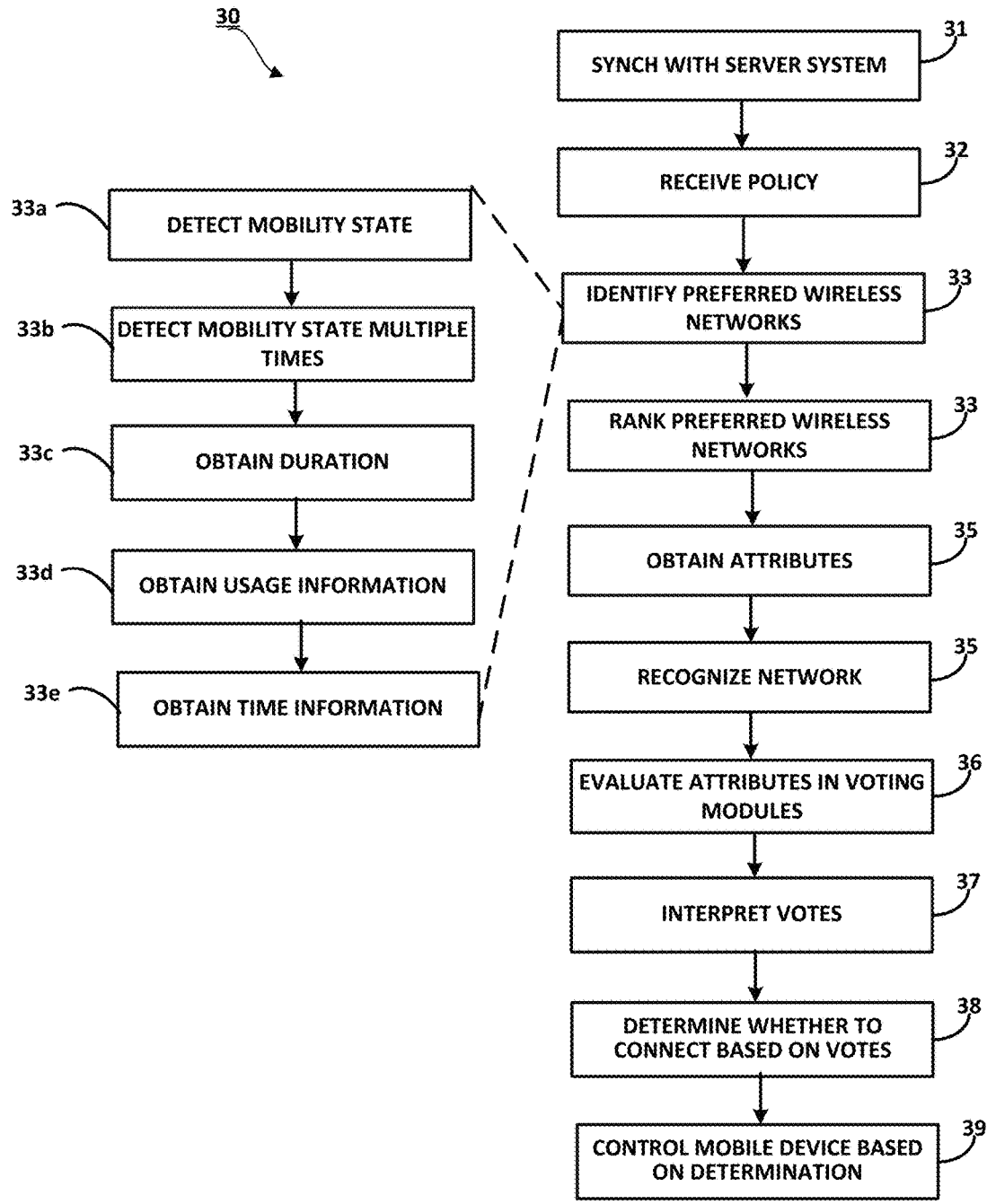
FIG. 2 is a flowchart showing an example process for prioritizing preferred networks when connecting to a wireless network.

FIG. 2 shows an example process 30 for implementing a system to determine whether to connect to a candidate network. Process 30 may be performed by client 18 in whole, or in part, on the architecture of FIG. 1. According to process 30, client 18 in mobile device 12 synchs (31) with server system 13 over one or more computer networks 19. As explained, during this synchronization, a policy may be pushed by the server system to the client, or the client may request and receive the policy from the server system. The policy specifies, among other things, the criteria that may be used for determining whether to connect to a candidate network, including how to identify a candidate network and how to prioritize connection to the candidate network, either inside of, or outside of, the voting process. As explained, a policy may specify which voting modules are to be used for making connection decisions, the baseline values that those voting modules are to use for making evaluations, the requirements for approving or denying connection based on voting, and so forth. In some implementations, the voting modules are software plug-in modules that are received from the server system as part of a policy, and that are incorporated into the client during synchronization with the server system. In some implementations, all or some of the voting modules may be hard-coded onto the mobile device, and the policy specifies which of these to use, and the baseline values therefor. In some implementations, the mobile device may obtain more than one policy from the server system during synchronization. As appropriate, multiple policies may be programmed into the client and used as described herein.

In some implementations, the client may configure the voting modules based on received policies so that the voting modules make evaluations about whether to connect to a candidate wireless network based, e.g., on device attributes, network attributes, or both device attribute(s), network attribute(s). Examples of attributes that may be used for evaluation by the voting modules include, but are not limited to, whether a network is a preferred network, e.g., the device's network preference, network throughput, network QoS, available network bandwidth, network latency, network security, network signal strength, network signal-to-noise (SNR) ratio, signal band, device ISP, number of users on the network, device processing capabilities, device internal memory, remaining device battery life, device battery capacity, and so forth. Other attributes not specified herein may be used instead of, or in addition to, those specified. In addition, attributes other than device and candidate network attributes may be factored into voting decisions. For example, if the device is moving into an area having large amounts of radio frequency (RF) background signals other radiation, or various barriers or obstacles, these may affect votes. For example, voting modules may be configured to evaluate whether a network in a high-RF area is appropriate for connection, and vote based on the amount of RF noise in the area.

In some implementations, each voting module evaluates a different attribute. For example, there may be a voting module to make an evaluation primarily based on network signal strength, a separate voting module to make an evaluation primarily based on throughput, a separate voting module to make an evaluation primarily based on whether a network is a preferred network for the device, and so forth. In some implementations, each voting module implements an evaluation process that is appropriate to evaluate its corresponding attribute. Accordingly, each voting module may implement a different process. The process implemented by each voting module may, however, take various attributes into account. For example, a voting module that makes its decision on device battery life may also take into account the strength of the network signal, since weak signals may consume more device resources, and thus battery life, than stronger signals.

In some implementations, a voting module may evaluate multiple attributes and output one or more votes based on that evaluation. For example, a single voting module may be configured to make evaluations based on both network preference and latency, and then output two votes—one vote relating to network preference and one vote relating to network latency. In some implementations, voting modules may evaluate the same attributes using different evaluation processes. For example, two or more different processes evaluating the same attribute may provide a more accurate assessment of that attribute than a single process. For example, one process may measure network QoS in terms of packet loss; another process may measure network QoS in terms of delay, another process may measure network QoS in terms of jitter, and another process may measure network QoS in terms of a combination of two or more of these attributes. In some implementations, different voting modules may make these determinations and each output a single vote, resulting effectively in four QoS votes. In some implementations, a single voting module may implement all of these processes and output four votes—one for each process. A policy may specify any appropriate method for determining an attribute, such as QoS, and program that method in the decision engine.

As noted, in some implementations, the voting modules may be hard-coded to perform evaluations based on attributes and baseline values that may, or may not, be adjustable. In some implementations, the voting modules may be adaptive. For example, an adaptive voting module may collect information about the mobile device that is based on use of the device, and configure itself to make a determination based on that information. In the example provided previously, an adaptive voting module may learn that a particular network is a preferred network, and incorporate that information into its voting process. For example, the adaptive voting module may identify a network as a mobile device's preferred network based on, e.g., routine and prolonged connection to the network, device mobility state, and so forth. The adaptive voting module may then use a network address such as a subnet address, an ISP associated with the network, and/or other information about the network as a basis for characterizing the network as a home or work network, for example. Preferred networks other than, or in addition to, home and work networks may be identified using the example processes described herein.

In some implementations, a policy may require all voting modules to be used each time there is a decision about whether to connect to a network. In some implementations, a policy may allow a subset of all voting modules to be used when there is a decision about whether to connect to a network. For example, the collection engine may provide attributes to the voting modules, and only those voting modules for which attributes are provided may be required, or able, to cast votes. In some implementations, a policy may specify that there must be a defined quorum of voting modules able to cast votes before a vote can be taken about whether to connect to a network. The defined quorum may include some defined minimum number of voting modules. In some implementations, the policy may require that all or some voting modules designated as critical may be required before a quorum is achieved. In some implementations, a user of the mobile device or third party in control of the policy may designate one or more of the attributes as critical to a connection decision. In this example, the corresponding voting module may also be designated as critical to achieving a quorum. For instance, network preference may be deemed a critical attribute to evaluate when making a decision to connect to a network. If information about preferred networks for the device is not available for voting, and thus the corresponding voting module cannot cast a vote relating to network preference, then the client may consider a quorum not to have been achieved, in which case a vote on the candidate network is not taken and no connection to the candidate network is attempted. In another example, network signal strength may be deemed a critical attribute to evaluate when making a decision to connect to a network. If information about signal strength of a candidate network is not available for voting, and thus the corresponding voting module cannot cast a vote relating to network signal strength, then the client may consider a quorum not to have been achieved, in which case a vote on the candidate network is not taken and no connection to the candidate network is attempted.

In some implementations, a policy may allow votes to be weighted based on one or more appropriate factors. For example, if an attribute is deemed to be critical, a vote relating to that attribute may be weighted more heavily than a vote relating to an attribute that is not deemed to be critical. Weighting may be implemented in any way that is appropriate for a given voting method. For example, a vote may be weighted more heavily than other votes if that vote is required to approve a network connection. In some implementations, votes may have numerical values, and weights may be used to increase the numerical values of votes relating to critical attributes. For example, a weight may increase the numerical value of a vote to reflect that the related attribute is critical. In some implementations, weighting may include increasing the number of votes relating to an attribute deemed to be critical. For example in a system that requires a simple or other majority of "approve" votes to make a connection, additional "approve" votes may be cast to reflect a greater weight applied to a corresponding (e.g., critical) attribute. In general, any appropriate weighting scheme may be used. In some implementations, weights may be adaptive, and change over time. For example, the more that a user interacts with a preferred network, the greater the weight that may be placed on votes relating to that preferred network.

In this regard, as noted, an example policy requires each vote to have one of the following values: approve, deny, or abstain; however, a policy may define votes in any appropriate manner and is not limited to the designations. In this example, a vote of approve indicates to approve connection to the candidate wireless network; a vote of deny indicates to deny connection to the candidate wireless network; and a vote of abstain indicates that the voting module that cast the vote intends to have no effect on connection to the candidate wireless network. The result of the voting is interpreted, and connection is, or is not, attempted based on the result. In some implementations, to approve a connection to a wireless network, the vote must be unanimous. In some implementations, there must be at least one vote to approve the connection, and no votes to deny the connection. There may, however, be votes to abstain. In some implementations, to deny a connection to a wireless network, only a single deny vote is required. For example, all other votes may be to approve the connection or to abstain; however, if a single deny vote is cast, the connection may be denied, in which case the connection is not attempted. In some implementations, if all voting modules abstain, no connection is attempted.

As noted, other voting mechanisms may be defined by policies. For example, as noted previously, votes may have numerical values. The numerical values may be based, e.g., on a defined importance of a corresponding attribute to the connection. For example, a greater numerical value may indicate that a particular attribute is more important to a connection. For example, if device network preference is defined to be more important than network security, an approve vote reflecting connection to a preferred network may have a value of ten, whereas an approve vote indicating that a network is secure (e.g., a security level that is above a defined baseline) may have a value of one. In some implementations, deny votes may have negative values that reflect how important a missing or non-complying attribute is to a connection. For example, if available network bandwidth is an important attribute, and the available network bandwidth for a candidate network is well outside the realm of acceptability, a relatively high negative number (e.g., −10) may represent a strong deny vote. Similarly, if packet loss is a less important attribute, and the measured packet loss for a candidate network is unacceptable, a relatively low negative number (e.g., −1) may represent a weak deny vote. In some implementations, votes such as these may be summed or otherwise processed and compared to a pre-defined threshold to determine if connection will be attempted. As noted previously, weights may be applied to these numerical values. In some implementations, the numerical values may be adapted over time based on usage of the device, capabilities of the device, information obtained by connection to various networks, and so forth. In some implementations, machine learning techniques may be performed to adapt the numerical values over time.

A policy may also define how votes from the voting modules are to be interpreted, e.g., assessed or evaluated. For example, as described, the votes may be counted, analyzed for content, summed, or otherwise processed in any appropriate manner to determine whether a connection is approved or denied. In this regard, after a connection to a candidate network is approved, a policy may include executable instructions for controlling the device to attempt, and to make, the connection. Whether the connection is actually made may depend upon various factors, such as whether the device has appropriate security credentials for the candidate network, whether a handshake between the device and the network server is successful, and so forth. In some implementations, the connection being attempted may be a new network connection. For example, the device may not currently be connected to a network, or the device may be attempting a second network connection. In some implementations, the connection being attempted may be part of a network switching operation, in which an existing connection to a network is severed, and a substitute connection to the candidate network is attempted. The policy may contain instructions for determining conditions according to which it is permitted to sever an existing connection and to reestablish the prior network connection if the connection to the candidate network is unsuccessful.

In some implementations, a policy may specify to prioritize a connection to a preferred wireless network by ranking wireless networks, and controlling connection to the wireless networks based on the rankings. For example, the policy may specify the operations the client is to perform to identify preferred wireless networks and, after the preferred wireless networks are identified to prioritize connection over those wireless networks by moving the preferred wireless networks up in a ranked list. The processes may employ voting on each network encountered in the list in order to determine whether to connect to the network. As described, the voting may be based on a variety of attributes, or the voting may be based solely on whether a network is a preferred network. In some implementations, voting may not be used. For example, if a preferred wireless networks on the list is encountered, the device may connect to, or attempt to connect to, that network automatically without regard to voting or other attributes. When controlling the device to connect to a wireless network, the device may start with the highest-ranked wireless network on a list and move down the list until a wireless network in-range of the device is encountered, and attempt connection to the wireless network. If a connection cannot be made for any reason, the client may move to the next, lower-ranked wireless network on the list in attempt connection. This process may continue until a connection is made or until there are no wireless networks to consider.

The foregoing policies are examples only. Any appropriate policy may be implemented using the server system and mobile devices described herein.

Referring back to FIG. 2, client 18 receives (32) one or more policies as a result of synchronization with the server system. The received policy or policies may be programmed into the client 18 to cause the device to operate in accordance with the policy. Programming a policy into the device may include incorporating instructions on how to identify preferred networks into the client, incorporating voting modules and their baseline values into the decision engine, incorporating baseline values into existing voting modules in the decision engine, and so forth. In some implementations, programming a policy into the device may include adding monitoring code into the device to monitor device usage for the purpose of creating device-specific voting modules, such as voting modules to vote on device network preference. In some implementations, more than one policy may be programmed into the client. If two or more policies have incompatible provisions, the client may resolve any incompatibilities in accordance with one or more stored rules.

Client 18 identifies (33) preferred wireless networks. In some implementations, a policy may identify preferred wireless networks, e.g., by network address or some other appropriate criteria provided in the policy. In some implementations, identifying preferred wireless networks may occur over time, and operations for identifying the preferred wireless networks may be set forth in the policy or may be otherwise stored on the device. In this regard, although FIG. 2 shows an example operation for identifying preferred wireless networks occurring after an example operation for receiving a policy, processes for identifying preferred wireless networks may occur over time, and be on-going. For example, in some implementations, processes for identifying wireless networks may be performed for a defined period, such as a week, a month, and so forth. Based on device usage during that period, including connections to various wireless networks, the processes may infer that one or more of those wireless networks are preferred networks. However, as the device continues to operate, it may continue to refine its original inference and, in some implementations, update its characterizations of networks as preferred or not based on device usage following the defined time.

Operations for identifying (33) a wireless network may include detecting (33a) a mobility state of the device in a presence of the wireless network. A determination about whether the wireless network is preferred may be based, at least in part, on the mobility state. Accordingly, the client detects (33) a mobility state of the device. The detection may be based on the policy or policies received. For example, if a policy specifies three velocity ranges that define the mobility states of the device, the client will obtain the velocity of the device and determine a velocity range into which the detected velocity falls. For example, the device velocity may be compared to a first threshold (e.g., 3 mph (miles-per-hour)) to determine if the velocity is in the first range; the device velocity may be compared to the first threshold and a second threshold (e.g., 3 mph and 15 mph) to determine if the velocity is in the second range, and the device velocity may be compared to the second threshold (e.g., 15 mph) to determine if the velocity is in the third rage. In some implementations, the velocity of the device may be detected, at least in part, using an accelerometer on the device. For example, the client may read the accelerometer of the device to obtain the velocity of the device. In some implementations, the velocity may be detected based on a duration of time that the device has been in the presence of a wireless network or networks. For example, in some cases, a device may be moving within a moving object. Accordingly, the accelerometer may indicate movement. However, the movement that is relevant is not overall movement of the device, but rather the movement of the device within the moving object. In cases like this, movement may be detected also based on the duration that the device was in the presence of a wireless network. Thus, in some implementations, velocity may be detected based on a combination of factors including, but not limited to, those listed here.

In this regard, velocity may be detected based on any combination of appropriate factors including, but not limited to, accelerometer readings, the duration of time that the device is in the presence of a wireless network, global positioning system (GPS) readings, and so forth. In some implementations, the mobility state may be characterized by movements in addition to, or instead of, the velocity of the device. For example, in some cases, rotational movements, pivoting movements, acceleration, deceleration, or other types of movement may affect, or may factor into, the characterization of a mobility state.

Operations for identifying (33) a wireless network may include detecting (33b) the mobility state of a device multiple times over the course of a time period. A determination about whether the wireless network is preferred may be based, at least in part, on the number of times the mobility state changes.

Operations for identifying (33) a wireless network may include obtaining (33c) a duration that the client is connected to, or in-range of, the wireless network. A determination about whether the wireless network is preferred may be based, at least in part, on the duration. For example, the client may read a clock on the device or a remote time source. In some implementations, the client may record a time that the device connects to the wireless network, and a time that the device disconnects from the wireless network. That time may be designated to be the duration. In some implementations, the client may record a time that the device comes into range of the wireless network, and a time that the device goes out of range of the wireless network. That time may be designated to be the duration. In some implementations, both types of duration measurements may be used.

Operations for identifying (33) a wireless network may include obtaining (33d) usage information representative of usage of the device while the device is on (e.g., connected to) the wireless network. A determination about whether the wireless network is preferred may be based, at least in part, on the usage information. For example, the client may monitor packet flow to and from the device over the wireless network. In an example, the client may monitor, and keep track of, data exchanged with the wireless network over at least a period of time (e.g., during connection of the device and the network or some other period of time). The client may monitor the number of HTTP (hypertext transfer protocol) commands initiated by the device over the network. Any appropriate indicator of device usage on the network may be monitored by the client based on its capabilities.

Operations for identifying (33) a wireless network may include obtaining (33e) time information while the device is on the wireless network. A determination about whether the wireless network is preferred may be based, at least in part, on the time information. For example, the client may read a clock on the device or a remote time source in order to obtain the time that the device connect to, or comes into range of, the wireless network. The client may record regular connections, or entries into range of, the wireless network. For example, the client may record that the device connects to the same wireless network every day between 6:00 PM and 8:00 PM. A network address may be used to identify the wireless network.

The process for identifying (33) a preferred wireless network may be based on factors including, but not limited to, the following: a mobility state of the device in the presence of a wireless network, a number of times the mobility state changes in the presence of the wireless network, the duration that the device is in the presence of the wireless network, the times of day and regularity with which the device is in the presence of the wireless network, and the usage of the device while in the presence of a wireless network. In an example operation, if the device remains in a low mobility state (e.g., 0-<3 mph) for at least a period of time in the presence of a wireless network, the client may infer that the device is on a preferred network. In an example operation, if the device does not change mobility states for a period of time in the presence of the wireless network, the client may infer that the device is on a preferred network. In an example, if client determines that the device has been in the presence of the wireless network for greater than a predefined duration, the processes may infer that the device is on a preferred network. In an example, if the client determines that the device is regularly in the presence of a wireless network at a particular time of day, the processes may infer that the device is on a preferred network. Combinations of two or more of these factors together may increase the likelihood that the device is on a preferred network. In some implementations, the process for identifying (33) a preferred wireless network may assign each of these factors a score. The processes may compile or otherwise process the scores for the factors, and make a determination based on the result about whether the device is on a preferred network. For example, the result may be quantified numerically and compared to a threshold, or the scores may be analyzed qualitatively to produce a result. As explained above, the client also may characterize the network based on information about the network, such as its subnet address, and/or based on information from the policy about the user. For example, if the policy indicates that a device user lives in Providence, R.I. and works in Boston, Mass., the client may identify a preferred network in Boston as being a "work" network and a preferred network in Providence as being a "home" network.

The foregoing policies are examples only. Any appropriate policy may be implemented using the server system and mobile devices described herein. Furthermore, although example values are ascribed above to low, intermediate/moderate, and high velocity ranges, those different ranges may be defined by any appropriate numerical velocities. Other factors, including those described herein, may affect how policies are implemented or may be included in the policies themselves. Furthermore, there may be less than, or more than, three mobility states for the mobile device.

Referring to FIG. 2, client 18 ranks (34) the wireless networks that have been determined to be preferred. In some implementations, the ranking may include elevating a priority of preferred networks over other, non-preferred networks. In some implementations, the ranking may include listing the networks in order from most preferred to not preferred. In some implementations, the higher the score is for a particular network, the more preferred that network is. In some implementations, other attributes, including those that affect performance described herein, may affect the ranking of the networks. For example, higher-performance networks may be prioritized over lower-performance networks. New networks that are encountered by the wireless device may not be on the list initially, but may be added to the list as they are evaluated. In some implementations, the ranking may be dynamic. For example, at different times of day, some networks may be preferred over others. For example, in the evening, a home network may have the highest priority, whereas during the day a work network may have the highest priority. In some implementations, the ranking process may include adding additional weight to votes or other mechanisms to determine whether to connect to a wireless network. In this regard, any appropriate ranking mechanism may be used. Connection to a network may be based on its ranking, at least in part.

Client 18 obtains (35) attributes relating to the device, to a candidate wireless network or networks, or to both the device and the candidate network(s). In some implementations, as noted, a collection engine 29 obtains the attributes. For example, the attributes relating to the device may be obtained from the device itself or from a device profile obtained from the server system at the time a policy is obtained. In some implementations, the attributes relating to the candidate network(s) may be obtained from the networks through measurement (e.g., by sending and receiving test packets), or from network profiles obtained from the server system at the time a policy is obtained. As was the case for identifying preferred networks, in some implementations, the attributes relating to the device, to the wireless networks, or to both the device and the wireless networks may be obtained by monitoring the device over time. Although FIG. 2 shows obtaining the attributes after ranking, the attributes may be obtained at any appropriate time, and are not limited to the sequence shown in FIG. 2

In some implementations, client 18 comes into range of, and recognizes (35) a wireless network. In this context, recognizing is not limited to identifying a known network, but rather includes identifying the existence of any network. In some implementations, following recognition of a network, client 18 may traverse a list of preferred networks starting with the highest-ranked wireless network on a list and move down the list until the identified wireless network is encountered. Once the network is found on the list, the client may attempt connection to the wireless network without regard to analyses of other attributes. That is, connection may be based solely on ranking. In some implementations, if the device is currently connected to a preferred network that is more-highly ranked than the newly-identified wireless network, the device may refrain from switching networks. If the newly-identified wireless network is not on the list, then other factors may dictate whether the device will connect to the wireless network.

In some implementations, client 18 comes into range of, and recognizes (35) the wireless network. In some implementations, client 18 may traverse the list starting with the highest-ranked wireless network on a list and move down the list to locate the identified wireless network. In this example, the wireless network may be identified as a preferred wireless network. In some implementations, the preferred network may be evaluated to determine its level of service. In some implementations, therefore, connection decisions may be based on both the fact that a network is a preferred network, and on the level of service that the preferred network provides. For example, in some cases, the level of service provided by a preferred network may be significantly lower than the level of service provided by a non-preferred network. In cases like this, it may be desirable to connect to, or to remain connected to, the non-preferred network. Accordingly, both the preferred and non-preferred networks may be evaluated, e.g., by the voting modules, to determine whether to connect to the preferred or non-preferred networks.

In this regard, the voting modules in the client evaluate (36) various attributes, including network preference and others, to generate votes. As explained, a voting module may evaluate one or more of the attributes and generate a vote, or votes, based on the evaluation. A vote indicating that a network is a preferred network may carry more weight than other votes, even though those other votes may be a factor in determining whether to connect to a preferred network. The client may then interpret (37) the votes as described herein, and make a determination (38) whether to connect to the wireless network based on the votes.

The client controls (39) the mobile device based on the determination. Controlling the device to attempt, or to implement, a connection to a wireless network may include, as described herein, causing the device to maintain an existing network connection based on constraints defined in one or more policies. Controlling the device to attempt, or to implement, a connection to a wireless network may include, as described herein, causing the device to sever an existing connection to a first wireless network and to create a new connection to a second wireless network based on constraints defined in one or more policies.

Figure 3:
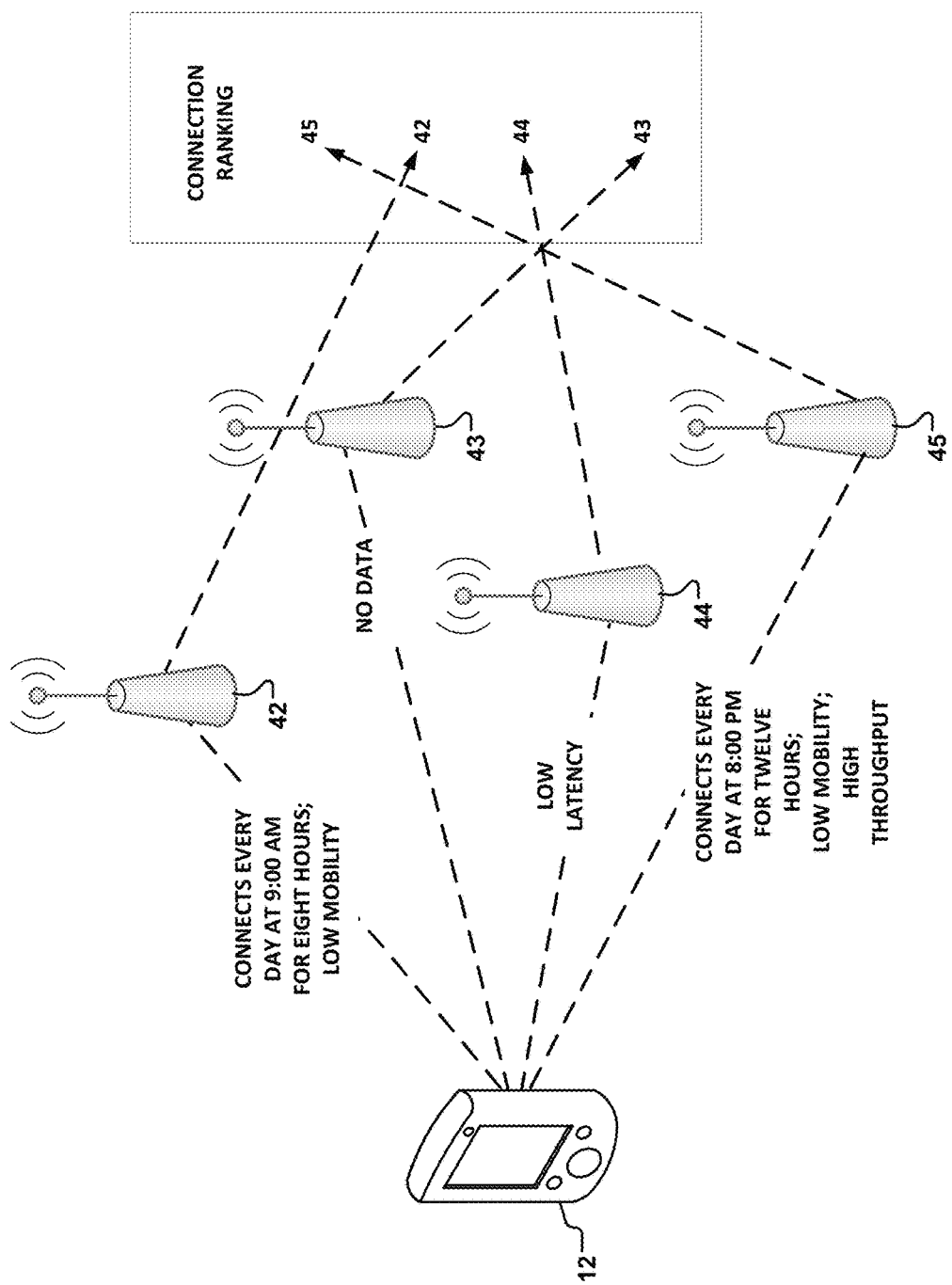
FIG. 3 is a block diagram showing ranking of various networks, including preferred networks, conceptually.

FIG. 3 shows an example ranking produced according to the processes described herein. As explained, this ranking influences the order in which connections to wireless networks are to be made. In this example, networks 42 and 45 are deemed to be home and work networks, respectively, because of the time of day, duration, and mobility states at which they are connected. In this example, the policy requires that networks also be ranked according to throughput. Here, network 45 is deemed to have high throughput, whereas network 42 is not. Accordingly, of those two networks, network 45 is ranked higher. Other policies may prioritize other attributes. For example, in some implementations, a home network always may be ranked highest. Of the two remaining networks, network 44 has low latency as measured and there is no data for network 43. According to the example policy, network performance is less importance than preferred networks, but networks with some data are ranked higher than networks with no data. Accordingly, network 44 is ranked third and network 43 is ranked last. These rankings may be used, as described herein, in determining network connection priority, and in processes for making network connections, as described herein.

In some implementations, user behavior or interaction with the mobile device may affect characterization of a wireless network as preferred. For example, if the client connects to a user network that it has characterized as preferred, or switches connection from an existing network to a network that the client has characterized as preferred, the user of the device may manually disconnect from the network that the client has characterized as preferred, or switch back to the existing network from the network that the client has characterized as preferred. The client may detect each time this action occurs based on device input. If this action (the user's manual switching) happens one or more times, then the client may infer that the client has mischaracterized the network as preferred. In some implementations, this action need only happen once for the client to infer that it mischaracterized the network as preferred. In some implementations, this action has to happen more than a threshold number of times (e.g., three, five, ten, etc. times) for the client to infer that it mischaracterized the network as preferred. In some implementations, this action has to happen more than a threshold number of times over a defined period of time measured, e.g., in minutes, hours, days, etc., for the client to infer that it mischaracterized the network as preferred. In cases where the client has mischaracterized the network as preferred, the client re-characterizes the network as non-preferred, and reduces the network to a ranking that is commensurate with its other attributes. For example, the original ranking of the network may be restored.

The processes have been described in the context of WiFi networks; however, the processes may be used with any appropriate wireless network or networks. Examples of such other networks include, but are not limited to, cellular networks, such LTE networks, 3G networks, and 4G networks, Internet-of-Things (IoT) networks, local area networks (LANs), wide area networks (WANs), or any appropriate combination of wireless networks. In this regard, the processes may be applied to switch connections between the same type, or between different types, of wireless networks.

The processes may be used with both managed and unmanaged wireless networks. In some examples, to operate on a managed network, the client obtains device security credentials along with a policy. Examples include, but are not limited to, a username and password. This information is provided to the wireless network during connection operations. In some examples, to operate on an unmanaged network, the device itself knows the security credentials, e.g., the security credentials are not provided by the sever system along with the policies. This information is provided to the wireless network during connection operations.

Computing systems that may be used to implement all or part of the server system described herein may include various forms of digital computers. Examples of digital computers include, but are not limited to, laptops, desktops, workstations, personal digital assistants, servers, blade servers, mainframes, and other appropriate computers. Computing systems may be part of, included in, or used to implement all or part of the mobile devices described herein. Examples of mobile devices include, but are not limited to, tablet computing devices, personal digital assistants, cellular telephones, smartphones, digital cameras, digital glasses and other portable computing devices. The computing devices described herein, their connections and relationships, and their functions, are meant to be examples only, and are not meant to limit implementations of the technology.

All or part of the processes described herein and their various modifications (hereinafter referred to as "the processes") can be implemented, at least in part, via a computer program product, e.g., a computer program tangibly embodied in one or more information carriers, e.g., in one or more tangible machine-readable storage media, for execution by, or to control the operation of, data processing apparatus, e.g., a programmable processor, a computer, or multiple computers A computer program can be written in any form of programming language, including compiled or interpreted languages, and it can be deployed in any form, including as a stand-alone program or as a module, part, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Non-transitory machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Each computing device, such as a smartphone or server, may include a hard drive for storing data and computer programs, and a processing device (e.g., a microprocessor) and memory (e.g., RAM) for executing computer programs.

A computing device may include a graphics system, including a display screen. A display screen, such as an LCD or a CRT (Cathode Ray Tube) displays, to a user, images that are generated by the graphics system of the computing device. As is well known, display on a computer display (e.g., a monitor) physically transforms the computer display. For example, if the computer display is LCD-based, the orientation of liquid crystals can be changed by the application of biasing voltages in a physical transformation that is visually apparent to the user. As another example, if the computer display is a CRT, the state of a fluorescent screen can be changed by the impact of electrons in a physical transformation that is also visually apparent. Each display screen may be touch-sensitive, allowing a user to enter information onto the display screen via a virtual keyboard. On some computing devices, such as a desktop or smartphone, a physical QWERTY keyboard and scroll wheel may be provided for entering information onto the display screen. A computing device, and computer programs executed thereon, may also be configured to accept voice commands, and to perform functions in response to such commands. For example, the example processes described herein may be initiated at a client, to the extent possible, via voice commands.

Elements of different implementations described herein may be combined to form other implementations not specifically set forth above. Elements may be left out of the processes, computer programs, interfaces, etc. described herein without adversely affecting their operation or the operation of the system in general. Furthermore, various separate elements may be combined into one or more individual elements to perform the functions described herein.

Other implementations not specifically described herein are also within the scope of the following claims.

What is claimed is:

1. A computerized method for operating a computerized client device, the computerized method comprising:
   detecting a mobility state of the computerized client device, the mobility state corresponding to an amount of motion by the computerized client device in a presence of a wireless network;
   obtaining one or more attributes relating to a plurality of wireless networks, the plurality of wireless networks comprising the wireless network, and the computerized client device being configured to connect to each of the plurality of wireless networks;
   evaluating the mobility state and the one or more attributes;
   determining, based at least in part on the evaluating, that the wireless network is a wireless network best suited for use by the computerized client device;
   based on the determining that the wireless network is the best suited wireless network, elevating a priority associated with the wireless network; and
   causing the computerized client device to establish data communication with the wireless network based, at least in part, on the elevating of the priority of the wireless network.

2. The computerized method of claim 1, further comprising:
   determining a duration that the computerized client device is in the mobility state;
   wherein the determining that the wireless network is the best suited wireless network is further based on the duration.

3. The computerized method of claim 1, further comprising:
   obtaining usage information, the usage information relating to usage of the computerized client device on the wireless network;
   wherein the determining that the wireless network is the best suited wireless network is based, at least in part, on the usage information.

4. The computerized method of claim 3, wherein the obtaining of the usage information comprises data relating to packet flow over the wireless network over at least a period of time.

5. The computerized method of claim 1, further comprising:
   obtaining time information, the time information relating to a period of time that the computerized client device is in the mobility state;
   wherein the determining that the wireless network is the best suited wireless network is based, at least in part, on the time information.

6. The computerized method of claim 5, wherein the obtaining of the time information comprises obtaining data relating to a time of day that the computerized client device is in the presence of the wireless network.

7. The computerized method of claim 1, further comprising:
   obtaining time information, the time information being based on one or more period of times the computerized client device is in the presence of the wireless network;
   wherein determining that the wireless network is the best suited wireless network is based, at least in part, on the time information.

8. The computerized method of claim 1, wherein:
   the mobility state is a first mobility state;
   the mobility state is detected multiple times over a time period, thereby resulting in multiple occurrences of the mobility state, the multiple occurrences of the mobility state comprising the first mobility state; and
   the determining that the wireless network is the best suited wireless network is based, at least in part, on the multiple occurrences of the mobility state.

9. The computerized method of claim 1, further comprising:
   determining a duration that the computerized client device is in the mobility state;
   obtaining usage information, the usage information relating to usage of the computerized client device on the wireless network; and
   obtaining time information, the time information based on at least one of: (i) when the computerized client device is in the mobility state, and (ii) when the computerized client device is in the presence of the wireless network;
   wherein the determining that the wireless network is the preferred wireless network is based, at least in part, on the duration, the usage information, and the time information.

10. The computerized method of claim 1, wherein:
    the elevating of the priority of the wireless network comprises applying one or more weights to one or more voting modules of the computerized client device;
    the one or more voting modules are each configured to evaluate data relating to the one or more attributes to generate a vote; and
    the causing of the computerized client device to establish the data communication with the wireless network based, at least in part, on the priority of the wireless network comprises:
    determining, based on one or more respective votes of the one or more voting modules, to establish the data communication between the computerized client device and the wireless network; and
    controlling the computerized client device to effect the establishment of the data communication.

11. The computerized method of claim 1, wherein the determining, based at least in part on the evaluating, that the wireless network is the best suited wireless network comprises determining a network of a premises of a user of the computerized client device is the preferred wireless network.

12. The computerized method of claim 1, further comprising:
    receiving data representative of a policy from a server apparatus, the data representative of the policy comprising (i) an identification of one or more preferred networks, and (ii) a command for the computerized client device to elevate a priority of the one or more preferred networks relative to one or more priorities associated with a plurality of other wireless networks.

13. The computerized method of claim 1, further comprising:
    detecting that the computerized client device has manually switched from, or disconnected from, the wireless network one or more times;
    based on the detecting that the user of the computerized client device has manually switched from, or disconnected from, the wireless network the one or more times, determining that at least one of the plurality of wireless networks is not a best suited network; and
reducing a priority of the at least one of the plurality of wireless networks relative to one or more respective priorities of other ones of the plurality of wireless networks.

14. The computerized method of claim 1, wherein the obtaining of the one or more attributes relating to the plurality of wireless networks comprises obtaining a plurality of respective throughputs the plurality of wireless networks and respective quality-of-service (QoS) rules associated with the plurality of wireless networks.

15. The computerized method of claim 1, wherein the evaluating of the mobility state and the one or more attributes comprises weighting the one or more attributes, the weighting comprising applying a certain number of votes to each of the one or more attributes, the votes being generated a plurality of voting modules of the computerized client device.

16. Computer readable apparatus comprising a non-transitory storage medium, the non-transitory storage medium comprising at least one computer program having a plurality of instructions, the plurality of instructions configured to, when executed on a processing apparatus:
identify a mobility state of a computerized client device, the mobility state corresponding to an amount of motion by the computerized client device within a wireless network of a plurality of wireless networks;
obtain data relating to one or more attributes of the plurality of wireless networks, the plurality of wireless networks comprising the wireless network, and the computerized client device configured to establish data communication with each of the plurality of wireless networks;
assess the mobility state and the one or more attributes;
determine, based at least in part on the assessment, that the wireless network is a preferred wireless network for the computerized client device;
based at least on the determination that the wireless network is the preferred wireless network, adjust a priority of the wireless network relative to respective priorities of a plurality of wireless networks; and
cause the computerized client device to establish data communication with the wireless network based, at least in part, on the adjusted priority of the wireless network.

17. The computer readable storage apparatus of claim 16, wherein:
the plurality of instructions are further configured to determine a duration that the computerized client device is in the mobility state; and
the determination that the wireless network is the preferred wireless network is based, at least in part, on the duration.

18. The computer readable storage apparatus of claim 16, wherein the plurality of instructions are further configured to:
obtain usage information, the usage information relating to usage of the computerized client device with respect to the wireless network; and
wherein the determination that the wireless network is the preferred wireless network is based, at least in part, on the usage information.

19. The computer readable storage apparatus of claim 18, wherein the usage information is based on data exchanged between the computerized client device and a headend entity associated with the wireless network over at least a period of time.

20. The computer readable storage apparatus of claim 18, wherein:
the plurality of instructions are further configured to:
obtain time information, the time information based on one or more times the computerized client device is in the mobility state; and
the determination that the wireless network is the preferred wireless network is based, at least in part, on the time information.

21. The computer readable storage apparatus of claim 20, wherein the time information is further based on a time of day that a user of the computerized client device is in the presence of the wireless network.

22. The computer readable storage apparatus of claim 16, wherein:
the mobility state comprises a first mobility state;
the mobility state is detected multiple times over a course of a time period;
multiple occurrences of the mobility state result from the multiple detections thereof, the multiple occurrences of the mobility state comprising the first mobility state; and
the determination that the wireless network is the preferred wireless network is based, at least in part, on the multiple occurrences of the mobility state.

23. The computer readable storage apparatus of claim 16, wherein the plurality of instructions are further configured to:
determine a duration that the computerized client device is in the mobility state;
obtain usage information, the usage information relating to usage of the computerized client device on the wireless network; and
obtain time information, the time information based on one or more of the following: (i) a duration that the computerized client device is in the mobility state, and/or (ii) a duration that the computerized client device is in the presence of the wireless network;
wherein the determination that the wireless network is the preferred wireless network is based, at least in part, on each of: the duration, the usage information, and the time information.

24. The computer readable storage apparatus of claim 16, wherein:
the plurality of voting modules are each configured to evaluate the one or more attributes to generate an individual one of the plurality of respective votes; and
the causation of the computerized client device to establish the data communication with the wireless network based, at least in part, on the adjusted priority of the wireless network comprises:
a determination, based on the plurality of votes, to establish the data communication between the computerized client device and the wireless network; and
control one or more components of the computerized client device to establish the data communication based on the determination to establish the data communication.

25. The computer readable storage apparatus of claim 16, wherein the wireless network comprises a network of a premises of a user of the computerized client device, the premises comprising a residence of the user.

26. The computer readable storage apparatus of claim 16, wherein the plurality of instructions are further configured to:
receive a policy from a server apparatus, the policy indicative of (i) one or more preferred networks and (ii) instructions for the computerized client device to adjust a priority of the one or more preferred networks.

27. The computer readable storage apparatus of claim 16, wherein the identification of the mobility state comprises identification of a velocity of the computerized client device, the velocity based on a duration of the computerized client device in the presence of the wireless network.

28. A computerized mobile device comprising:
processing apparatus; and
a storage apparatus in data communication with the processing apparatus, the storage apparatus comprising at least one computer program configured to, when executed on the processor apparatus:
receive data relating to a mobility state of the computerized mobile device, wherein the mobility state corresponds to an amount of motion by the computerized mobile device within a wireless network;
identify one or more attributes, wherein the one or more attributes are associated with at least one of: the computerized client device and the plurality of other wireless networks, and/or the wireless network;
evaluate the mobility state and the one or more attributes;
determine, based at least in part on the evaluation, that the wireless network is a wireless network best suited for use by the computerized mobile device;
based on a determination that the wireless network is the wireless network best suited for use by the computerized mobile device, increase a priority of the wireless network relative to one or more priorities associated with a plurality of other wireless networks; and
cause the computerized mobile device to establish data communication with the wireless network based, at least in part, on the increased priority of the wireless network.

29. The computerized mobile device of claim 28, wherein:
the increase of the priority of the wireless network comprises application of one or more weights to one or more voting modules of the computerized client device in order to generate one or more votes;
the one or more voting modules are each configured to (i) evaluate data representative of the one or more attributes and (ii) generate an individual one of the one or more votes based on the evaluation; and
the causation of the computerized client device to establish the data communication with the wireless network comprises:
a determination, based on the one or more votes, to establish the data communication between the computerized client device and the wireless network; and
based on the determination to establish the data communication, control at least one functionality of the computerized client device to effect establishment of the data communication.

* * * * *